United States Patent [19]

Ôkubo

[11] Patent Number: 4,486,773
[45] Date of Patent: Dec. 4, 1984

[54] CATV PAY SYSTEM

[75] Inventor: Kazutomo Ôkubo, Matsutoh, Japan

[73] Assignee: Hokuryo Denko Co., Ltd., Ishikawa, Japan

[21] Appl. No.: 381,511

[22] Filed: May 24, 1982

[30] Foreign Application Priority Data

May 28, 1981 [JP] Japan .................................. 56-82395

[51] Int. Cl.³ ............................................. H04N 7/10
[52] U.S. Cl. ........................................ 358/84; 358/86;
455/2; 455/5
[58] Field of Search .................... 358/84, 86; 455/5, 2, 455/3, 4, 6

[56] References Cited

U.S. PATENT DOCUMENTS 4,031,543  6/1977  Holz ....................... 358/86
4,085,422  4/1978  Niwata ................... 358/118
4,245,245  1/1981  Matsumoto ............. 358/84

FOREIGN PATENT DOCUMENTS 51-115718  10/1976  Japan .
51-142213  12/1976  Japan .
53-130917  11/1978  Japan .
56-47178   4/1981   Japan .
2063027    5/1981   United Kingdom .

Primary Examiner—Howard W. Britton
Attorney, Agent, or Firm—Cushman, Darby & Cushman

[57] ABSTRACT

A two-way CATV system comprising a central equipment, a plurality of television receiver sets each disposed with a terminal unit and a wired two-way transmission channel provided between the central equipment and each of the terminal units.

14 Claims, 4 Drawing Figures

CATV PAY SYSTEM

This invention relates to Community Antenna Television (CATV) pay systems.

A CATV pay system, in which the television signals of ordinary broadcast programs received by an antenna and television signals of local originated television programs are transmitted by way of a cable network to each of a plurality of television receiver sets, and a subscriber for the system who wants to view at least one of the ordinary broadcast programs and the locally originated programs by his receiver set is requested to pay a charge on viewing a particular program in accordance with a viewing time slot, usually employs suitable means to ensure such pay-viewing. Such means include, for example, adding jamming signals to television signals on the transmitting station, transmitting the thus added television signals and the jamming signals to each of the television receiver sets and enabling a subscriber to view a particular television program by eliminating the jamming signals on his television receiver set for a predetermined period only when he pays the viewing charge (for instance, by putting a coin into a coin timer provided to the television receiver set); or converting the television signals on the transmitting station once into the signals in a frequency band that can not be received with usual television receiver sets, transmitting the thus converted television signals to the receiving sets, actuating another frequency converter additionally provided to each of the television receiver sets for a predetermined period (only when the subscriber puts a coin into a coin timer) thereby converting the frequency band of the received television signals again to the usual frequency band and enabling the subscriber to view the desired program. However, if the CATV pay system using such coin timers includes a large number of receiver sets, charge collecting jobs will take much time and utmost care has to be taken in employing persons for the task of charge collection who deal with a great sum of cash.

In a CATV pay system in which television receiver sets are always polled from a central control unit disposed at a television signal transmitting station for monitoring the viewing states of the sets and viewing charge for each of the receiver sets is calculated in the control unit, if the system is altered intentionally on the receiving side by a subscriber who undertakes unauthorized charge-free viewing, or if some accidents occur in the transmission line connecting the transmitting station and the receiver sets to each other, then the viewing states can no longer be monitored, thus failing to conduct correct calculation for the viewing charges. Particularly if the trouble should occur in the common transmission line, charge calculation becomes impossible for all of the television receiver sets.

Further, in a CATV pay system equipped with the central control unit in which the viewing period for each of the television receiver sets is stored once in a memory device disposed in each of them, the stored period is read out from the memory device at a predetermined time interval to the central control unit and the viewing period thus read out is stored into a memory device provided on the transmitting station (that is, the viewing period is stored both on the receiving side and the transmitting side). The memory device on the transmitting station requires a memory capacity as large as the total capacity for the respective memory devices disposed on each of the television receiver sets, which increases the system cost.

An object of this invention is to provide a CATV system capable of saving charge collecting jobs and enabling the confirmation for viewing charge centralized in one site.

Another object of this invention is to provide a CATV system capable of reducing the capacity of memory devices on the transmitting station and decreasing the system cost.

A further object of this invention is to provide a CATV system capable of reliably maintaining a viewing charge signal and preventing the cancellation thereof even in a case where an abnormality makes it impossible to send the viewing charge signal from the receiving side to the transmitting side occurs (such as failure in a two-way transmission line or in a case where the cancellation of the charge signals is plotted by a subscriber).

A further object of this invention is to provide a CATV system capable of saving the provision of memory devices on the transmitting station for the store of the viewing charges for each of the television receiver sets and decreasing the number of signals to be transferred between the transmitting side and the receiving side.

A further object of this invention is to provide a CATV system for enabling each subscriber to visually confirm the viewing charge by a display on each of the television receiver sets.

In accordance with this invention, there is provided a two-way CATV system having a central equipment unit, a plurality of television receiver sets each equipped with a terminal unit and a wired two-way transmission line provided between the central equipment and each of the terminal units. The central equipment units comprises means for generating a television signal, means capable of inputting a read out instruction for viewing charge to each of the terminal units and outputting the viewing charge in a visible form in accordance with a viewing charge signal supplied thereto, means for mixing the television signal from the generating means with the read out instruction signal for the viewing charge from the input/output means and means for transmitting the signals mixed in the mixing means to the transmission line and extracting the charge signal sent thereto via the transmission line and supplying the same to the input/output means. Each of the terminal units comprises means for extracting the read out instruction signal for the viewing charge from the mixed signal supplied thereto via the transmission line and transmitting the viewing charge signals for the viewing charge supplied thereto to the transmission line, selection means capable of selecting the television signal to be received by a corresponding television receiver set, means for measuring the time period during which a pay television program is selected by the selection means and calculating the viewing charge corresponding to the time period, a memory means for storing the charge data signal calculated in the calculation means, means for reading out the viewing charge signal stored in the memory means and supplying the same to the extraction means when the read out for the viewing charge is demanded by the read out instruction signal for the viewing charge extracted in the extraction means, and means for sending the television signal that is selected by the selection means among the television signals supplied from the extraction means to the corresponding television receiver set in a receivable form.

Further, in accordance with this invention, there is provided a two-way CATV pay system having a central equipment unit, a plurality of television receiver sets each equipped with a terminal unit and a two-way transmission line for connecting them in a wired system. The central equipment unit comprises a repeater for a television broadcast band signal, a transmitter for a local television broadcast band signal, a central control unit, a downstream signal sender for sending instruction data from the central control unit to each of the terminal units, an upstream signal receiver for receiving upstream viewing charge data signal sent from each of the terminal units only upon collection of the viewing charge, a mixer for mixing the broadcast television signal from the repeater, the local broadcast television signal from the transmitter and downstream instruction data from the downstream signal sender and transmitting them to the two-way transmission line, a branching filter for filtering the upstream viewing charge data sent from each of the terminal units and sending them to the upstream signal receiver and an input/output device for supplying instruction data to the central control unit and printing out the received upstream viewing charge data. Each of the terminal units comprises a mixer and branching filter connected to the two-way transmission line for filtering the broadcast television and local broadcast television signals and the downstream instruction data from the central equipment and mixing the upstream viewing charge data signal sent from the terminal unit to the transmission line, a terminal counter and control unit for counting the utilization time in the terminal unit, calculating the viewing charge and controlling the terminal unit, a downstream signal receiver for receiving the downstream instruction data signal filtered in the mixer and branching filter and supplying the same to the terminal counter and control unit, an upward signal sender (controlled by the terminal counter and control unit when the instruction data for demanding the viewing charge is obtained by the downstream instruction data signal) for sending the upstream viewing charge data only upon demand of the viewing charge, a channel selection switch controlled by the terminal counter and control unit for allowing a subscriber to select desired broadcast band signals, a converter controlled by the terminal counter and control unit for converting one of the broadcast television signal and the local broadcast television signal filtered from the mixer and branching filter into one of the channels for the television receiver set, a non-volatile memory controlled by the terminal counter and control unit for storing and maintaining the viewing charge data calculated in the counter and control unit, a viewing charge display controlled by the terminal counter and control unit for the numerical indication of the viewing charge data and an address setter connected to the terminal counter and control unit for setting an address inherent to each of the terminal units. The downstream instruction data signal and the upstream viewing charge data signal are transferred in online system between the central equipment and each of the terminal units, the viewing charge data being maintained and displayed in the terminal unit in the case where the transmission of the viewing charge data signal is disabled.

The foregoing and other objects, and the features of this invention will be made clearer by the following explanations for a preferred embodiment according to this invention referring to the accompanying drawings. However, this invention is no way limited only to the embodiment specified below.

Figure 1:
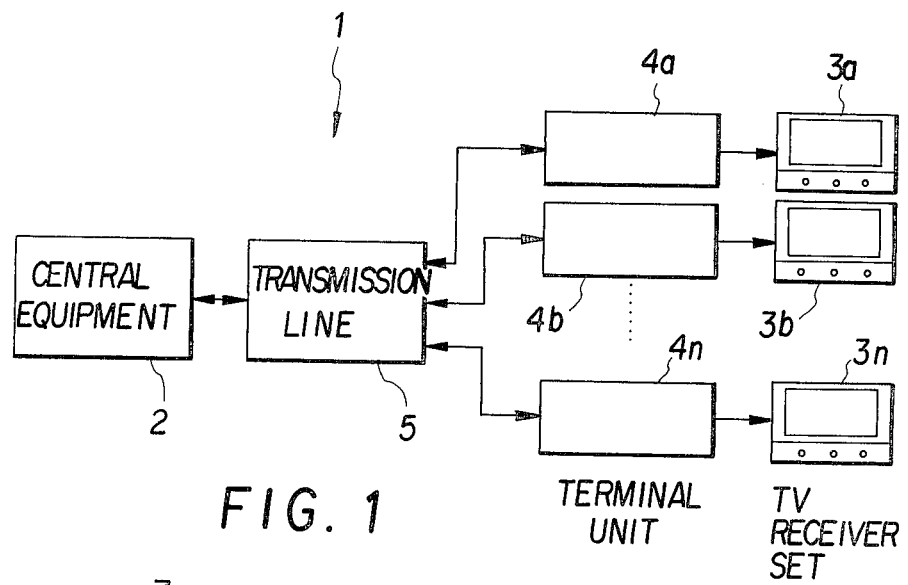
FIG. 1 is a schematic block diagram of a two-way CATV system as a preferred embodiment according to this invention.

Referring to FIG. 1, a two-way CATV pay system 1 comprises a central equipment unit 2, a plurality of television receiver sets or TV receiver sets 3a, 3b, ... 3n, terminal units 4a, 4b, ... 4n provided respectively to each of the TV receiver sets 3a, 3b, ... 3n, and a two-way wired transmission line 5 for connecting the central equipment 2 and each of the terminal units 4a, 4b, ... 4n.

Figure 2:
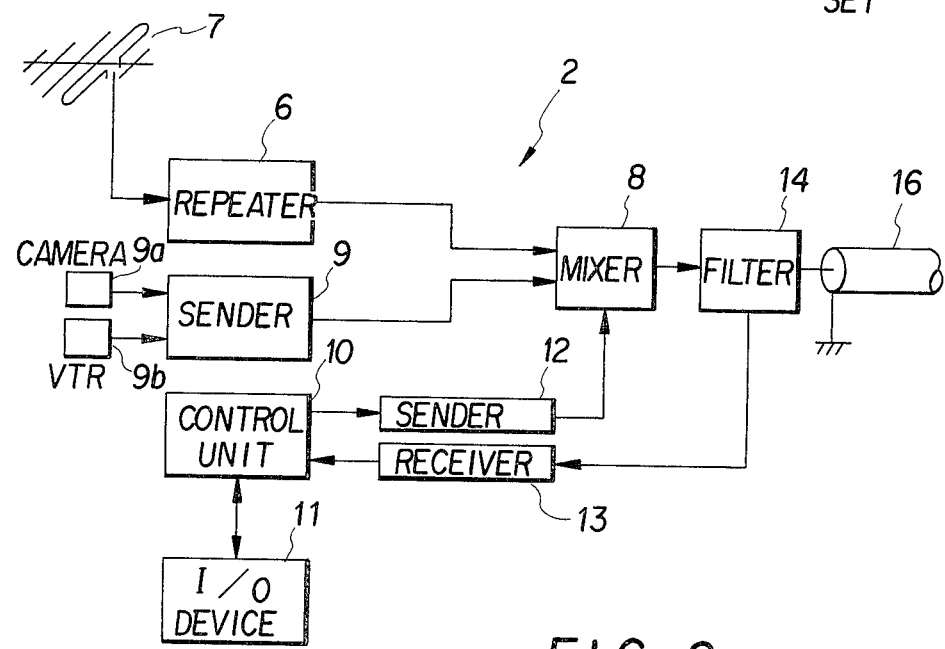
FIG. 2 is a detailed block diagram for the central equipment shown in FIG. 1.

FIG. 2 shows the central equipment unit. A repeater or resender 6 amplifiers, by menas of a broad band amplifier, the signals of a usual television broadcast program received on an antenna 7 and sends them to a mixer 8. A sender 9 modulates, by means of a modulator, a carrier signal by video signals and audio signals of a locally originated program produced by a TV camera 9a or a video tape recorder (VTR) 9b, generates local broadcast television signals with a carrier frequency different from that of the television signals for the usual television broadcast program, and supplies them to the mixer 8. The central control unit 10 has a memory device storing a control program therein. When an address signal and a read out instruction signal for viewing charge to one of the terminal units 4a to 4n designated by the address signal are supplied from an input/output device 11 to the control unit 10, the control unit 10 supplies the address signal and the read out instruction signal for the viewing charge to the sending device 12, in accordance with the control program from the memory device. While on the other hand, when viewing charge signal incorporating the address signal indicating one of the terminal unit 4a to 4n is supplied from a receiver 13 to the central control unit 10, the central control unit 10 actuates the input/output device 11 to perform a printing operation based on the address signal and the viewing charge signal.

The input/output device 11 in the central equipment 2 comprises a keyboard and a printer, in which the address signal and instruction signal (for example, the read out instruction signal for the viewing charge) can be supplied to the control unit 10 by the operation of the keyboard switch. The letters for distinguishing each of the terminal units 4a to 4n and the viewing charge are printed out on a bill or the like by way of a printer in accordance with the signals from the control unit 10. The sender 12 converts various instruction signals incorporating the address signal of the control unit 10 consisting of parallel binary signals into serial binary signals, modulates a carrier signal by each of the bits for the converted serial binary signals by way of frequency shift keying (FSK) modulation specified with two frequencies of 2.7 KHz and 2.3 KHz and then sends them to the mixer 8.

The mixer 8 in the central equipment unit 2 mixes the television signals from the senders 6, 9 and the FSK-modulated instruction signal from the sender 12 and sends them to a branching filter 14. The filter 14 in the central equipment 2 transmits the signal from the mixer 8 to the coaxial cable 16 in the line 5 on one hand and filters the signals sent from the terminal units 4a to 4n via the cable 16 in the line 5 and supplies them to the receiver 13 on the other hand.

The receiver 13 demodulates the FSK-modulated signals from the filter 14, converts the demodulated serial binary signal into a parallel binary signal and supplies the converted signal to the control unit 10. A phase lock loop can be used, desirably, as the demodulator in the receiver 13.

Figure 3:
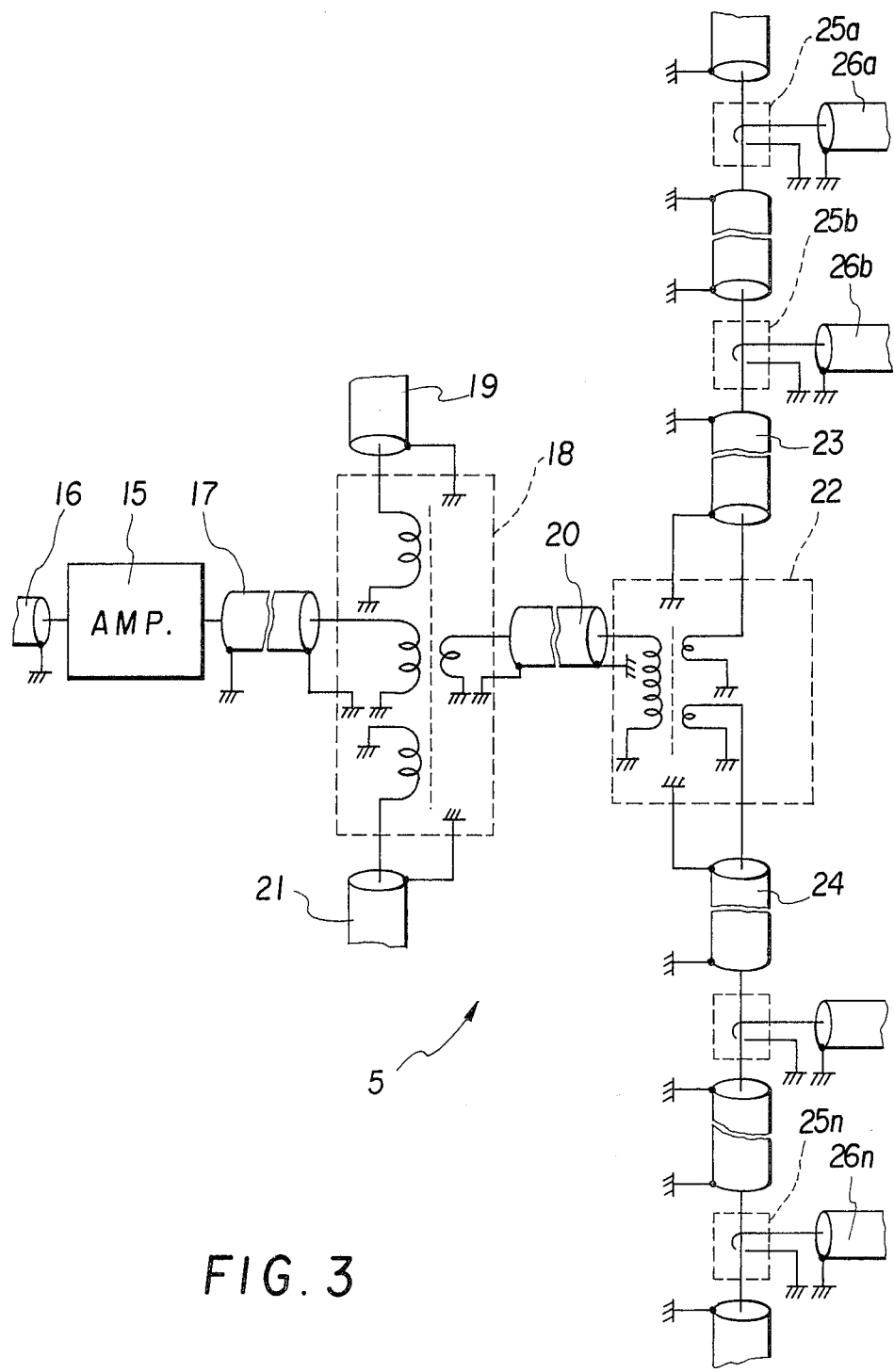
FIG. 3 is a detailed block diagram for the two-way transmission line shown in FIG. 1.

Referring to FIG. 3, a broad band amplifier 15 in the line 5 amplifies the signal sent from the filter 14 in the central equipment 2 and sends them via the coaxial cable 17 to a branch circuit 18 on one hand and amplifies the signals sent from the circuit 18 via the coaxial cable 17 and sends them to the filter 14 via the coaxial cable 16 on the other hand. The amplifier 15 may also be adapted so as to amplify only the television signal and not the viewing charge signal or the instruction signal. In the two-way branch circuit 18 of the line 5, the coaxial cable 17 is electromagnetically coupled with a plurality of coaxial cables 19 to 21. The coaxial cables 19 to 21 are connected to the signal distrbutors respectively (for example, the coaxial cable 20 is connected to a distributor 22). The two-way distributor 22 distributes the signal sent via the coaxial cable 20 into coaxial cables 23 and 24 on one hand, and sends the signals from the coaxial cable 23 and 24 into the single coaxial cable 20 on the other hand. The cables 23 and 24 are respectively connected via the two-way couplers or serial units 25a, 25b, ... 25n to coaxial cables 26a, 26b, ... 26n. The signals from the cables 23 and 24 are transmitted via the couplers 25a, 25b, ... 25n to the coaxial cables 26a, 26b, ... 26n respectively. The signals from the cables 26a, 26b, ... 26n are transmitted via the couplers 25a, 25b, ... 25n to the coaxial cables 23 and 24, respectively.

Figure 4:
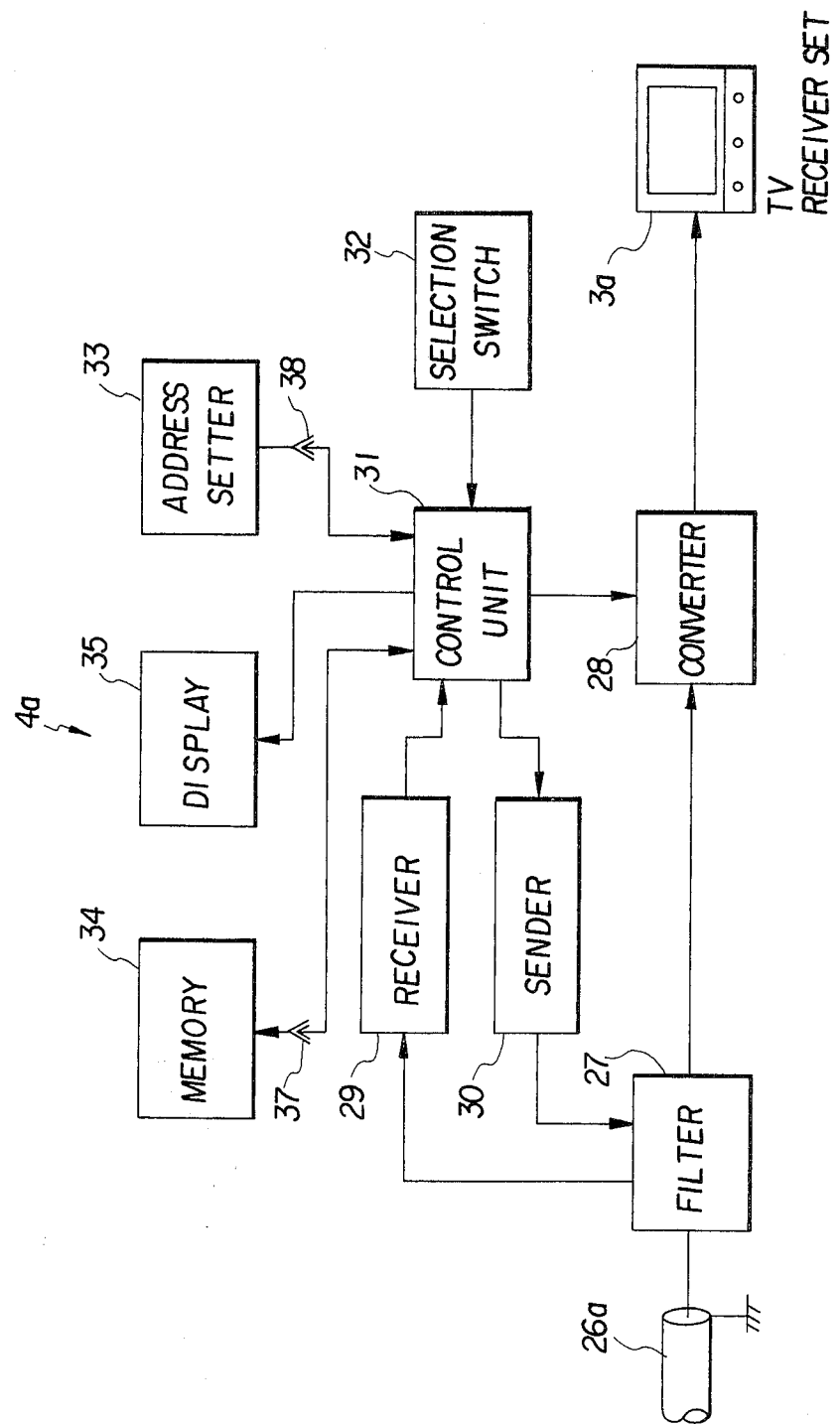
FIG. 4 is a detailed block diagram for one of the terminal units shown in FIG. 1.

Since each of the terminal units, 4a, 4b, ... 4n has the same structure, explanation will be made hereinafter for one terminal unit 4a. In the terminal unit 4a shown in FIG. 4, a branching filter 27 filters the television signal and the instruction signal incorporating the address signal sent via the cable 26a and sends the television signal to a frequency converter 28 and the instruction signal to a receiver 29 respectively. The branching filter 27 sends the address signal and the viewing charge signal from the sender 30 to the cable 26a. The receiver 29 has the same structure as the receiver 13 in the central equipment 2, that is, it is adapted so as to demodulate the FSK-modulated instruction signal from the branching filter 27, convert the demodulated serial binary signal into a parallel binary signal and supply the converted signal to a terminal control unit 31. The control unit 31 comprises a read only memory that stores a control program, an input/output interface for the signal transfer, a register for temporarily storing the signal, a random access memory and an accumulator for performing mathematical operations. The control unit 31 can, preferably, be structured in a smaller size by using an available one chip microcomputer (for example, a 5L8049 available from Mitsubishi Denki Co., Ltd.)

A selection signal from a channel selection switch 32, an instruction signal from a receiver 29, an address signal from an address setter 33 and a viewing charge signal stored in a non-volatile memory 34 can be supplied to the control unit 31. The control unit 31 supplies a calculated charge signal to the memory 34 and a display 35, a charge signal (read out from the memory 34) and the address signal (from the setter 33) to the sender 30, and a control signal to a converter 28, respectively. When a signal for selecting a pay television program is inputted from the switch 32, the control unit 31 measures the viewing time period for the pay television program calculates the viewing charge corresponding to the measured time period to prepare a charge signal and supplies the charge signal to the memory 34 and the display 35. The control unit 31 has a detector for comparing an address set to the address setter 33 with the address signal incorporated in the instruction signal from the receiver 29 and for detecting the coincidence between both of the addresses as distinguishing signals. If a coincidence signal is issued from the detector, the control unit 31 stores the instruction signal from the receiver 29 once in the memory 34, reads out the charge signal from the memory 34 by the instruction signal and sends the read out charge signal together with the address signal to a sender 30.

If the instruction signal received on the receiver 29 is an instruction for the interruption of the charge calculation, a release instruction for the interruption of the charge calculation, an instruction for setting the reference time or the like, the control unit 31 stores such an instruction in the memory 34. The control unit 31 performs its controlling operation in accordance with the contents of the instruction signal stored in the memory 34. For instance, in the case where the instruction signal for the interruption of the charge calculation is stored in the memory 34, the control unit 31 applies no control signal to the converter 28 even when the channel selection switch 32 issues a signal indicating that the pay television program has been selected, thus interrupting the selection for the pay program without performing calculation for the viewing charge. On the other hand, in another case where an instruction signal for cancelling the interruption of the charge calculation is supplied from the receiver 29 to erase the instruction signal for the interruption of the charge calculation stored in the memory 34, the control unit 31 will calculate the viewing charge when the pay television broadcasting program is selected subsequently. In the case where such data specifying the addition of 100 yen on every ten minutes for one pay program and 100 yen on every 15 minutes for another pay program respectively are stored in the memory 34 by the instruction for setting reference time, the control unit 31 adds 100 yen on every 10 or 15 minutes to calculate the charge based on the reference time stored in the memory 34 when unit 31 receives (from the switch 32) a signal indicating that a pay program has been selected. Further, if such charge-free instruction as billing no charges for the short time viewing (for example, of about one minute) for a pay program are stored in the memory 34, the control unit 31 inhibits the charge signal from being stored in the memory 34 for one minute after the selection of the pay program by referring to the one minute data as a short time stored in the memory 34. Control unit 31 stores a charge signal, for example, of 100 yen into the memory 34 instantly after the elapse of one minute and, thereafter, adds 100 yen on every elapse of 10 minutes after selection of the pay program, thereby storing the results of the addition as the charge signal to the memory 34. This can prevent the billing of charges in the case where a subscriber erroneously selects a short time pay program or can prevent the intentional charge-free viewing of a pay program plotted by a subscriber (such as by releasing the selection of a pay program just prior to the elapse of the reference time after the selection of the pay program).

In summary, the control unit 31 supplies a control signal to the converter 28 by the signal from the switch 34 and controls the converter 28 in such a way that only the one television signal (among the television signals from the filter 27 that is indicated by the signal from the switch 32 can be received by a TV receiver set 3a. In the case where the television signal indicated by the signal from the switch 32 is for the pay program, the control unit 31 starts counting the viewing time period and, if the viewing time period exceeds one minute (for example), it supplies the viewing charge signal calculated based on the viewing time period to the memory 34 and the display 35. Thereafter, control unit 31 adds the unit viewing charge to the viewing charge stored in the memory 34 upon every elapse of the reference time stored in the memory 34 and supplies the newly added viewing charge signal to the memory 34 and the display 35.

The sender 30 has the same structure as the sender 12 in the central equipment unit 2, that is, it is adapted so as to convert the address signal and the charge signal composed of parallel binary signal from the control units 31 into serial binary signal, modulate a carrier signal by each of the bits for the converted serial binary signal by way of FSK modulation defined with two frequencies of 2.7 KHz and 2.3 KHz and send them to the filter 27.

When the converter 28 receives no selection control signal from the control unit 31, the converter 28 inhibits the television signal supplied from the branching filter 27 from being sent to the receiver set 3a. On the other hand, if the converter 28 receives a control signal from the control unit 31, the converter 28 performs frequency conversion for the television signal, among those sent from the branching filter 27, in such a way that the frequency of the television signal indicated by the control signal is disposed within the frequency band of a predetermined channel in the TV receiver set 3a, and sends the converted television signal to a receiver set 3a. The converter 28 can preferably be formed by using, for instance, an integrated circuit device for PLL frequency synthesizer for use with television (such as M5420P manufactured by Mitsubishi Denki Co., Ltd.) and an electronic tuning type frequency converter.

The memory 34 is a so-called non-volatile memory whose memory contents are not lost even when the power supply to the terminal unit 4a is interrupted. The memory 34 can formed comprise, for example, a magnetic core memory device or a CMOS RAM or the like backed-up by an auxiliary power source such as a battery. The memory 34 and the control unit 31 are electrically connected by way of a separable connector 37. By separating the memory 34 from the control unit 31 at this connector 37, the memory 34 can be detached from the terminal unit 4a and, as the result, the memory contents stored in the memory 34 can be examined even when the power supply to the terminal unit 4a is interrupted.

The display 35 is composed of a light-emitting diode (LED), a liquid crystal device or a plasma display device and indicates the charge in numerical figures by using the charge signal from the control unit 31 (thereby display the viewing charge for the watching of the pay program).

The setter 33, supplies binary parallel N bit (for example, 9 bit signals comprising an 8 bit address signal indicating the terminal unit 4a and a one bit address abnormality signal indicating the abnormality in the address signal to the control unit 31) is electrically connected with the control unit 31 by way of a connector 38 separable into two parts. The setter 33 is adapted such that if the setter 33 and the control unit 31 are normally connected electrically by way of the connector 38, the address abnormality signal applied to the control unit 31 takes a logic level "0." On the other hand, if the setter 33 and the control unit 31 are disconnected electrically at the connector 38 by the intentional action of a subscriber or the like, the address abnormality signal supplied to the control unit 31 changes to logic level "1". Alternatively, the address abnormality signal may be set to such a logic condition that the 9 bits of the parallel binary signal supplied to the control unit 31 always include an even number or an odd number of bits indicating the logic level of "1" or "0" in order to detect the change in the address setting to the setter 33 plotted by a subscriber.

The switch 32 is operated when one of the television signals from the filter 27 is selected when switch 32 is operated, a signal indicating the selected television signal is sent from the switch 32 to the control unit 31.

In ordinary TV receiver set can be used for TV receiver set 3a. In the case where such an ordinary TV receiver set is employed, the channel selection switch thereof is fixed and the television signal from the converter 28 is received by one specified channel.

In using the two-way CATV pay system 1, the input-/output device 11 of the central equipment 2 is installed, for instance, at the front of a hotel at a position convenient for operation while disposing other components of the central equipment unit 2 in one of the rooms of the hotel. The terminal units 4a to 4n and TV receiver sets 3a to 3n are respectively to each of the guest rooms, with the equipment 2 and each of the terminal units 4a to 4n being connected by way of the line 5.

In each of the guest rooms, usual broadcast television programs and local broadcast television programs sent from the central equipment 2 can optionally be viewed on each of the TV receiver sets 3a to 3n by operating the channel selection switch in each of the terminal units 4a to 4n. When local broadcast television signal for a pay program is viewed in the guest room where the TV receiver set (e.g., set 3a is placed), the control unit 31 counts the viewing time period, calculates a viewing charge, sends a viewing charge signal to the display 35 and the memory 34 of the terminal unit 4a. The display 35 therefore indicates the viewing charge in accordance with the received charge signal and, at the same time, the memory 34 stores the charge signal.

When a guest checks out of the hotel, the switch on the keyboard of the input/output device 11 installed at the front desk is operated for inputting the address of the guest room to be checked out and demanding the viewing charge. Then, the central control unit 10 applies the instruction signal incorporating the address signal to the sender 12. Upon receiving the instruction signal, the sender 12 converts the signal into serial binary signal, applies FSK-modulation and sends it to the mixer 8. The instruction signal received by the mixer 8 is transmitted via the filter 14 and the line 5 to the terminal units 4a to 4n and received via the filter in each of the terminal units 4a to 4n to the receiver. The receiver in each of the terminal unit 4a to 4n demodulates the sent instruction signal incorporating the address signal, converts the signal after the demodulation into parallel binary signal and sends it to the corresponding control unit. The control unit in each of the terminal units 4a to 4n compares the received address signal with an address signal from the address setter to judge whether a coincidence is established between the two signals. When the address signal sent from the receiver 29 is identical with the address set by the setter 33 in the terminal unit 4a, the control unit 31 decodes the instruction signal succeeding the address signal, reads out the charge signal stored in the memory 34 if the instruction signal is for the charge demand, sends the charge signal and a signal indicating the address of the terminal unit 4a to the sender 30 and, at the same time, erases the charge signal stored in the memory 34. The sender 30 converts the address signal and the charge signal into serial binary signal and sends the converted address signal and charge signal to the filter 27 while applying FSK modulation. The FSK-modulated address signal and the charge signal are supplied via the line 5 to the filter 14 in the central equipment 2 and, thereafter, supplied to the receiver 13. The receiving device 13 demodulates the supplied signal, converts the same into the parallel binary signal and sends it to the control unit 10. The control unit 10 supplies the address signal and the charge signal thus supplied to the input/output device 11. Input/output device 12 prints out the guest room number and the charge corresponding to the address signal and the charge signal on a bill.

In the case where no charge signal is received from the terminal units 4a to 4n after the elapse of a certain period from the instant of the input of the instruction for the demand of charge read out from the input/output device 11, the control unit 10 regards it as an abnormality in the circuit for line 5 and/or the terminal units 4a to 4n and causes the input/output device 11 to print out at abnormality message. Since each memory in the terminal units 4a to 4n corresponding to the memory 34 is a non-volatile memory, if abnormality occurs in the line 5 and/or terminal units 4a to 4n, the memory contents in the memory 34 can directly be read out to obtain the charge signal (by separating the memory 34 from the control unit 31, for instance, at the connector 37). If the abnormality occurs in the line 5, the viewing charge can be determined on the display in each of the terminal units 4a to 4n.

In the case of sending an address signal or the like from the sender 12, the sent out address signal is inputted via the filter 14 to the receiver 13. However the control unit 10 controls the receiver 13 so as to interrupt its receiving operation temporarily during the sending operation of the sender 12. The receiver in each of the terminal units is controlled in the same manner. However, if the frequency band for the FSK-modulated signal from the sender 12 in the central equipment 2 and the frequency band for the FSK-modulated signal from the sender in each of the terminal units 4a to 4n are made different, such a temporary interruption of the receiving action is not necessary.

The instructions supplied from the central equipment 2 to the terminal units 4a to 4n are not restricted only to those instructions mentioned above (such as interruption of charge calculation, release of the interruption for charge calculation, charge setting and viewing charge demand) but they may include those for controlling power source ON-OFF to the TV receiver sets 3a to 3n, for inhibiting one or a plurality of local broadcast television signal from viewing and for transmitting messages to the plurality of guest rooms. These instructions are also inputted from the input/output device 11 and appropriately processed in each of the control units.

The keyboard-printer combination is not always necessary for the input/output device; the printer may be omitted or, alternatively, a CRT display may further be provided to the printer.

Further, the control unit 10 in the central equipment 2 may be connected to a central computer used in the hotel for exchanging the data between each other, whereby the viewing charges can be printed out together with the hotel charges on a bill upon check out to facilitate billing or accounting.

As stated above specifically, the two-way CATV pay system according to this invention, can minimize the risk of disabling the calculation for the viewing charge, enable a system owner to perform easy and reliable confirmation of the viewing charges and enable a user to view a pay television programs while confirming the increase in the charges.

What is claimed is:

1. A two-way CATV system comprising a central equipment unit, a plurality of television receiver sets each disposed with a terminal unit and a wired two-way transmission line provided between the central equipment and each of the terminal units, in which said central equipment unit comprises means for generating a television signal, means for inputting a read out instruction for viewing charge to each of the terminal units and outputting the viewing charge in a visible form in accordance with a viewing charge signal supplied thereto, means for mixing the television signal from the generating means with the read out instruction signal for the viewing charge from an input/output means and means for transmitting the signal mixed in the mixing means to the transmission line and extracting the charge signal sent thereto via the transmission line and supplying the same to the input/output means, and wherein each of said terminal units comprises means for extracting the read out instruction signal for the viewing charge from the mixed signal supplied thereto via the transmission line and transmitting the viewing charge signal supplied thereto to the transmission line, selection means for selecting the television signal to be received by a corresponding television receiver set, means for measuring the time period during which a pay television program is selected by the selection means and calculating the viewing charge corresponding to the time period, memory means for storing the charge data signal calculated in the calculation means, means for reading out the viewing charge signal stored in the memory means and supplying the same to the extraction means when the read out for the viewing charge is demanded by the read out instruction signal for the viewing charge extracted in the extraction means, and means for sending the television signal that is selected by the selection means among the television signals supplied from the extraction means to the corresponding television receiver set in a receivable form.

2. The CATV system of claim 1, wherein each of the terminal units further comprises means for indicating the viewing charge in accordance with the viewing charge signal supplied from the calculation means.

3. The CATV system of claim 2, wherein each of said terminal units further comprises means for generating a distinguishing signal for distinguishing the terminal units from each other and means for detecting the coincidence between the distinguishing signal from the distinguishing signal generation means and the distinguishing signal contained in the read out instruction signal for the viewing charge, in which, upon detection of the coincidence on the detection means, the read out for the viewing charge signal from the corresponding memory means is performed by the read out means in the corresponding terminal unit.

4. The CATV system of claim 3, wherein said memory means comprises a non-volatile memory capable of maintaining the viewing charge signal stored therein even when the power supply to the memory means is interrupted.

5. The CATV system of claim 3, wherein said means for generating the television signal comprises means for receiving standard television broadcast signals by way of an antenna and means for producing local television broadcast signals, the usual television broadcast signals and the local television broadcast signals being applied to the mixing means.

6. The CATV system of claim 5, wherein the receiving channel of each television receiver set is fixed to one channel, said means for sending television signals to the television receiver set in a receivable form comprising means for converting the frequency band of the television signal selected by the selection means into a frequency band corresponding to the one channel fixed on the television receiver set, and wherein the television signal selected by the selection means is frequency-converted by the conversion means and then supplied to the television receiver set.

7. The CATV system of claim 5, wherein each of said terminal units comprises means for inhibiting the store of the charge data signal calculated in the calculation means into the memory means in the case where the time period measured by the calculation means is less than a predetermined value.

8. The CATV system of claim 7, wherein each of said memory means is detacheably connected to the corresponding terminal unit.

9. A two-way CATV pay system having a central equipment unit, a plurality of television receiver sets each equipped with a terminal unit and a two-way transmission line for connecting said plurality of terminal units to said central equipment unit in a wired system, wherein the central equipment unit comprises repeater means for repeating a television broadcast band signal, transmitter means for transmitting a local television broadcast band signal, a central control unit, downstream signal sender means for sending instruction data from the central control unit to each of the terminal units, upstream signal receiver means for receiving upstream viewing charge data signal sent from each of the terminal units only upon collection of the viewing charge, mixer means for mixing the broadcast television signal from the repeater means, the local broadcast television signal from the transmitter means for a local broadcast television signal and downstream instruction data from the downstream signal sender means and transmitting them to the two-way transmission line, branching filter means for filtering the upstream viewing charge data sent from each of the terminal units and sending them to the upstream signal receiver means and input/output means for supplying instruction data to the central control unit and printing out the received upstream viewing charge data, and wherein each of said terminal units comprises mixer and branching filter means connected to the two-way transmission line for filtering the broadcast television and local broadcast television signals and the downstream instruction data from the central equipment and mixing the upstream viewing charge data signal sent from the terminal unit to the transmission line, terminal counter and control means for counting the utilization time in the terminal unit, calculating the viewing charge and controlling the terminal unit, downstream signal receiver means for receiving the downstream instruction data signal filtered in the mixer and branching filter means and supplying the same to the terminal counter and control unit means, upward signal sender means, controlled by the terminal counter and control means when the instruction data demanding the viewing charge is obtained by the downstream instruction data signal, for sending the upstream viewing charge data only upon demand of the viewing charge, channel selection means controlled by the terminal counter and control means for allowing a subscriber to select desired broadcast wave signals, converter controlled by the terminal counter and control means for converting one of the broadcast television signal and the local broadcast television signal filtered from the mixer and branching filter means into one of the channels of the television receiver set, non-volatile memory means controlled by the terminal counter and control means for storing and maintaining the viewing charge data calculated in the counter and control means, viewing charge display means controlled by the terminal counter and control means for numerically indicating the viewing charge data and address setter means connected to the terminal counter and control means for setting an address inherent to each of the terminal units, wherein the downstream instruction data signal and the upstream viewing charge data signal is transferred in outline system between the central equipment unit and each of the terminal units, the viewing charge data being maintained and displayed in the terminal unit in the case where the transmission of the viewing charge data signal is disabled.

10. The CATV pay system of claim 9, wherein said non-volatile memory means in each of the terminal units is detachably connected and said non-volatile memory means can be detached for reading out the viewing charge data stored therein in the case where the power supply for the terminal units is interrupted to disable the indication for the viewing charge and the upstream signal sender means is not operated.

11. The CATV pay system of claim 9, wherein said calculation for the viewing charge conducted by the terminal counter and control means is inhibited for a certain period of time after the start of the viewing.

12. The CATV pay system of claim 9, wherein said non-volatile memory means in each of the terminal units maintains the viewing charge data and the downstream instruction data setting the charge corresponding to the contents of the program being sent as the local broadcast television signal.

13. The CATV pay system of claim 9, wherein said address setter means in each of terminal units produces address data and address abnormal data.

14. The CATV pay system of claim 9, wherein said central control unit sends the downstream instruction data for the interruption of charge calculation to each of the terminal units in the absence of the local broadcast television signal and the terminal unit does not calculate the charge in the absence of the local broadcast television signal during the reception of the downstream instruction data for the interruption of the charge calculation.

* * * * *